Patented May 25, 1948

2,442,074

UNITED STATES PATENT OFFICE 2,442,074

PROCESS FOR BREAKING PETROLEUM EMULSIONS

Melvin De Groote, University City, and Arthur F. Wirtel, Glendale, Mo., assignors to Petrolite Corporation, Ltd., Wilmington, Del., a corporation of Delaware No Drawing. Application July 13, 1945, Serial No. 604,994

8 Claims. (Cl. 252—340)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

And still another object of our invention is to provide a new demulsifier for petroleum emulsions of the water-in-oil type.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent used in our herein described process for resolving petroleum emulsions consists of an ester containing a polyhydric alcohol radical, a diglycollic acid radical, and an acyloxy radical, derived from a detergent-forming monocarboxy acid having 8 to 32 carbon atoms, at least one polyhydric alcohol hydroxyl being esterified with a group containing such acyloxy radical and the number of such groups esterified with polyhydric alcohol hydroxyls being less than the total number of polyhydric alcohol hydroxyls (esterified or unesterified) of polyhydric alcohol contained in the product. In other words, the number of the groups comprising an acyloxy radical containing 8 to 32 carbon atoms and derived from a detergent-forming monocarboxy acid having 8 to 32 carbon atoms that are ester-linked to at least one polyhydric alcohol radical, is less than the valency of the said polyhydric alcohol radical.

Detergent-forming monocarboxy acids are those acids having at least 8 carbon atoms which have the capacity to react with alkali to form soap or soap-like products and are exemplified by fatty acids containing 8 to 32 carbon atoms such as oleic, linoleic, ricinoleic, stearic, hydroxystearic, palmitic, linolenic, erucic, clupanodonic, myristic, etc., and fatty acids of the character referred to are normally regarded as preferable. The term detergent-forming carboxy acid includes naphthenic acids. Naphthenic acids are derived from various petroleums, or are obtained by treatments which involve oxidation of hydrocarbon bodies present in the naturally-occurring crude oils. The number of carbon atoms in naturally-occurring naphthenic acids may vary from 10 carbon atoms to 32 or even to 38 carbon atoms. Naphthenic acid or admixtures of the type available on the open market and which preferably have a saponification value in the neighborhood of about 250, are suitable. Naphthenic acids of the kind referred to are readily esterified with glycerol to form naphthenin on intimate admixture and agitation in the presence of dried hydrochloric acid gas, using a procedure that is substantially the same as that generally employed in the formation of stearin from stearic acid and glycerol. It is known that such naphthenic acid can be treated, for example, with halogens so as to produce derivatives such as chloronaphthenic acid. Also included among the detergent-forming acids, are those monocarboxy acids sometimes called wax acids or paraffin acids, which are formed as a result of oxidation of paraffin or petroleum waxes, particularly those derived from paraffin base hydrocarbons and which include hydroxylated, as well as non-hydroxylated acids. Acids occurring in certain waxes such as carnaubic acid, cerotic acid, lanopalmic acid and lanoceric acid, are considered detergent-forming monocarboxy acids. Rosin and resinic acids, such as abietic acid, are likewise included. Such acid materials, due to the fact that they react with alkalis to form soap or soap-like products, are commonly called detergent-forming acids.

The terms "hydroxylated detergent-forming acids" and "hydroxy detergent-forming acids," refer to those detergent-forming acids which contain in the acyl radical thereof an hydroxyl or the equivalent. The most common types of hydroxylated detergent-forming carboxy acids are hydroxylated fatty acids containing 8 to 32 carbon atoms, such as ricinoleic acid, mono- and dihydroxy-stearic acid, trihydroxy palmitic acid, etc. Ester products adapted for use in the invention herein described, contain at least one radical of an hydroxylated detergent-forming acid, and preferably, such radical is a radical of an hydroxylated fatty acid containing 8 to 32 carbon atoms. In addition, hydroxylated detergent-forming acids such as hydroxylated wax acids, may be used.

While the terms detergent-forming monocarboxy acid and hydroxylated detergent-forming monocarboxy acid, include oxidized acids, as well as acids in their naturally-occurring state, those fatty bodies which are drastically oxidized have distinctive properties and characteristics and certain ester products containing such drastically oxidized bodies are claimed in our co-pending application, Serial No. 604,996, filed July 13, 1945.

One simple type of esterification product that is illustrative of ester products referred to above, is derivable in the following manner: A detergent-forming monocarboxy acid, e. g., a fatty acid, such as oleic acid or stearic acid, may be represented as RCOOH, wherein RCOO is the conventional acyloxy radical. Such acid may be esterified with a polyhydric alcohol so as to yield a partial ester containing a free hydroxyl in the alcoholic residue. Thus, if 1 mole of the detergent-forming acid (e. g. stearic acid) is reacted with one mole of glycol, the reaction may be indicated as follows:

$$RCOOH + C_2H_4(OH)_2 \longrightarrow RCOOC_2H_4OH + H_2O$$

The partial or fractional ester thus formed may be reacted with diglycollic acid and used for the herein described purposes. The reaction involved may be indicated thus:

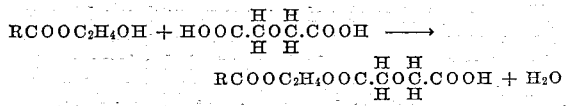

Similarly, a detergent-forming acid of the RCOOH type may be reacted with glycerol or polyglycols or polyglycerols. Typical partial esters containing a polyhydric alcohol radical and containing one or more hydroxyl groups which are not esterified with a group containing acyloxy radical derived from a detergent-forming carboxy acid, are:

$$RCOOC_3H_5(OH)_2$$
$$(RCOO)_2C_3H_5OH$$
$$RCOOC_2H_4OC_2H_4OH$$
$$(RCOO)_2C_3H_5OC_3H_5(OH)_2$$

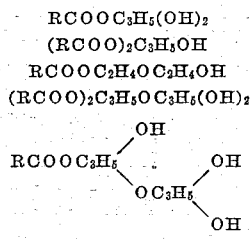

The reaction of the first compound indicated above with diglycollic acid, serves to illustrate this particular type; and may be indicated as follows:

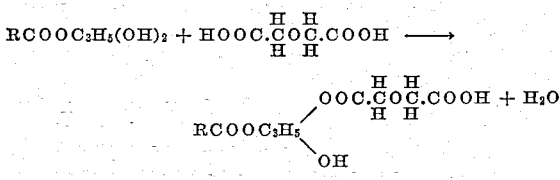

The other free hydroxy radical may also be esterified with a molecule of diglycollic acid. Likewise, similar reactions with any or all of the free hydroxyls of the other compounds listed above may take place to yield products of esterification suitable for the purposes herein indicated.

Other examples of polyhydric alcohols which may be employed to form partial esters of the character referred to, are ethylene glycol, alpha beta gamma butane triol, beta methyl glycol, triethylene glycol, 1,3-propane diol, isobutylene glycol, ethylene glycol, glycerol ether, monoethylene glycol ether, mannitol, sorbitol, sorbitol monobutyl ether, erythritol, adonitrol, mannitan, sorbitan, etc.

While, as above illustrated, a detergent-forming monocarboxy acid may be reacted with a polyhydric alcohol to yield a partial ester having one or more residual hydroxyls available for esterification with diglycollic acid, it is also possible to first react diglycollic acid with a polyhydric alcohol to yield an ester having one or more unreacted hydroxyl groups available for esterification with a detergent-forming monocarboxy acid. However, the reaction is usually easier to control, if the polyhydric alcohol used is first reacted with a detergent-forming acid and the fraction ester thus obtained is subsequently reacted with diglycollic acid. In either case, the resulting product is regarded as a product of esterification between diglycollic acid and an hydroxylated ester of a detergent-forming monocarboxy acid.

The hydroxy esters employed for reaction with diglycollic acid to form ester products for the hereindescribed purposes, need not necessarily be prepared by reacting the detergent-forming acid with the polyhydric alcohol directly. In many instances, it is more convenient to prepare these hydroxy esters by re-esterification of fats, oils, or detergent-forming acid esters with polyhydric alcohols. For example, a fat such as stearin may be re-esterified with glycerol to form glycerol monostearate, which may subsequently be reacted with diglycollic acid. Such partial esters are mentioned, inasmuch as they are commonly produced and available on the open market. Similar products are obtained by re-esterification of oils, fats, and detergent-forming acid esters with other polyhydric alcohols, such as diglycerol, glycols, sorbitol, mannitol, etc. Analogous partial esters may be obtained from rosin acid, naphthenic acid, or the like.

It is also possible to perform the re-esterification simultaneously with the esterification of diglycollic acid. For example, a mixture of a fatty oil, a polyhydric alcohol and diglycollic acid, may be mixed and heated together to yield an ester product that may be used according to this invention.

If the detergent-forming carboxy acid is hydroxylated, e. g., is an hydroxylated fatty acid such as ricinoleic acid, hydroxystearic acid, or the like, and has the carboxylic hydrogen atom replaced by a hydrocarbon or oxyhydrocarbon containing one or more hydroxyls, the foregoing typical formulae for hydroxyl-containing esters of detergent-forming carboxy acids would appear as $$OHRCOOC_3H_5(OH)_2$$
$$(OHRCOO)_2C_2H_5OH$$
$$OHRCOOC_2H_4OH$$
$$OHRCOOC_2H_4OC_2H_4OH$$
$$(OHRCOO)_2C_3H_5OC_3H_4(OH)_2$$

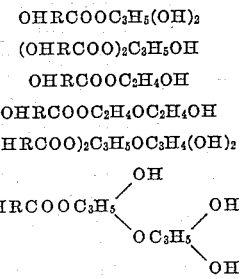

Examples of such materials are glyceryl monoricinoleate, glyceryl diricinoleate, ethylene glycol dihydroxystearate, sorbital di-dihydroxystearate, etc.

Taking the first of the foregoing formulae as illustrative, the reaction with diglycollic acid may result in a number of ester products, the following being illustrative:

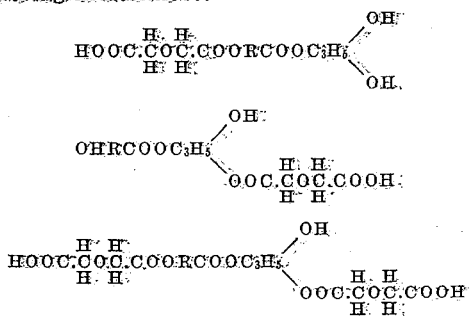

Similarly, one or more of the hydroxyl radicals of the other compounds may become esterified with a carboxyl radical of diglycollic acid.

If esterification conditions are quite severe, namely, at a relatively high temperature and for a prolonged interval of time, both carboxyls of diglycollic acid may react with hydroxyls present in a partial ester, so as to form a multi-atomic ring. Such compounds may be illustrated by the following formula:

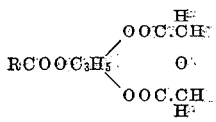

in which there is no free carboxyl and which comprises a closed ring structure heterocyclic in character. While such compounds are suitable, it is preferable that the reaction be carried out so that there will be a free carboxyl group in the ester product. Whether or not the ultimate ester product contains a residual hydroxyl group is largely immaterial.

In carrying out an esterification reaction involving a polyhydric alcohol, a detergent-forming carboxy acid and diglycollic acid, it does not necessarily follow that the polyhydric alcohol radical inevitably becomes directly connected to the acyloxy group of the detergent-forming carboxy acid when the detergent-forming carboxy acid is hydroxylated. For example, a detergent-forming carboxylic body such as ricinoleic acid ethyl ester, may be esterified with diglycollic acid so as to form the partial ester:

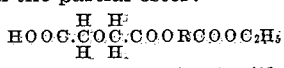

which may be further esterified with glycol, for example, to form a product which may be represented by the formula:

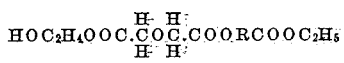

and it may be noted that the product contains a polyhydric alcohol radical and contains only one acyloxy radical derived from a detergent-forming carboxy acid in a group that is esterified with an hydroxyl of the polyhydric alcohol. Since part only of the hydroxyl radicals contained in the parent polyhydric alcohol are esterified with a group containing such acyloxy radical, the compound above mentioned falls within the ester products of the present invention for use in connection with the herein described purposes. In this particular instance the group containing the acyloxy radical (RCOO) that is esterified with an hydroxyl of the parent polyhydric alcohol, is the group:

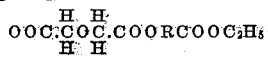

A preferred type of compound of the character just described and illustrated, may be prepared by first reacting a glyceride or a glycol ester with diglycollic acid, and then neutralizing a free carboxyl group of diglycollic acid by esterification with a polyhydric alcohol. For example, one mole of a triglyceride such as triricinolein, may be esterified with two moles of diglycollic acid to produce di(diglycollated) riricinolein which may be represented by the following formula:

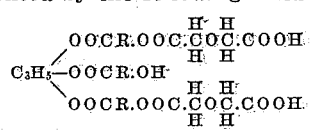

If 1 mole of di(diglycollated) triricinolein is then esterified with 2 moles of glycerol, the following product may be obtained.

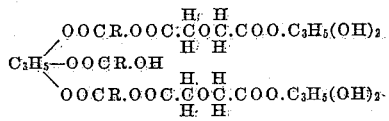

Likewise, one may esterify only one carboxyl radical, if desired.

If 2 moles of di(diglycollated) triricinolein are reacted with one mole of glycol, for example, a more complex molecule may be formed by cross linkage through the glycol residue, as represented by the following formula:

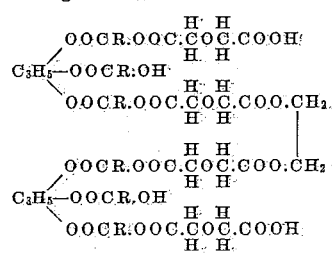

Similarly, 1 mole of tri(diglycollated) triricinolein may react with 1 mole of glycol to form a compound which may be represented by the following formula:

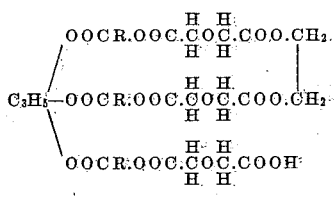

Another example is the resultant of an esterification reaction between triricinolein and diglycollic acid which may comprise more complex molecules, such as the following, which illustrate cross linkage through the polyhydric residue:

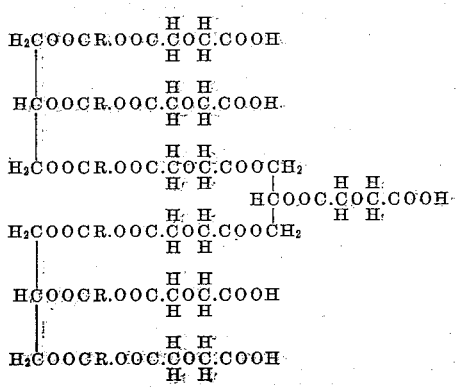
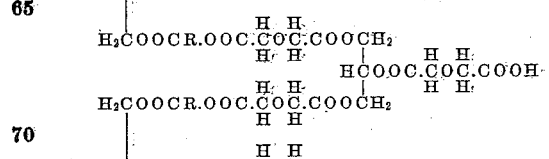
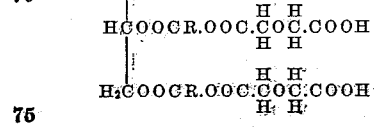

All of the compounds of the character above referred to are regarded as ester products derivable by reaction between diglycollic acid and a hydroxy compound containing an acyloxy radical derived from a detergent-forming monocarboxy acid having 8 to 32 carbon atoms and containing a polyhydric alcohol residue, the number of groups that contain an acyloxy radical derived from a detergent-forming monocarboxy acid and that are esterified with a polyhydric alcohol hydroxyl, being less than the total number of polyhydric alcohol hydroxyls (esterified or unesterified) of polyhydric alcohol contained in the product. In such compounds it is preferable that there be at least one free carboxyl group, and preferably, as part of a diglycollic acid radical, and also preferably a free hydroxyl radical in addition.

In the esterification product the presence of a residual hydroxyl group is desirable, but may be eliminated. Thus, any such residual hydroxyl group may be left as such, or, if desired, may be reacted either with additional diglycollic acid, or with monobasic detergent-forming carboxy acid, provided the number of acyloxy groups derived from the detergent-forming carboxy acid is maintained less than the number of hydroxyls of the parent polyhydric alcohol material contained in the ester product as a residue. Alternatively, any such residual hydroxyl may be acylated with monocarboxy acids having less than 8 carbon atoms. The ester product covered herein may include such simple acylated derivatives.

While reference has been made previously to various detergent-forming monocarboxy acids, it is apparent that simple derivatives, such as the halogenated compounds, are functional equivalents. For example, chlorinated ricinoleic acid, or chlorinated triricinolein may be employed instead of ricinoleic acid, or triricinolein. Brominated oleic acid may be used instead of oleic acid. Also hydrogenated abietic acid may be used instead of abietic acid. In such cases the monobasic detergent-forming carboxy material, notwithstanding modifications of the kind indicated, still has the same functional properties as the unmodified material, and thus acts in the same manner, as far as esterification reactions of the character herein described are concerned. It is also possible, for example, to condense two moles of ricinoleic acid and produce one mole of monobasic diricinoleic acid. Likewise, monobasic triricinoleic acid and monobasic tetraricinoleic acid may be used. Also the condensation product of a substance such as ricinoleic acid or hydroxystearic acid, with some non-fatty hydroxy acid, such as lactic acid, may be used. It is to be understood that the term detergent-forming monobasic carboxy acid includes such functional equivalents.

Generally speaking, the esters hereinabove described are substantially water-insoluble, i. e., are not soluble in 1 part to 1,000 parts of water at 50° F. Water solubility can be increased by obvious variants, as, for example, in the instance of intermediate compounds derived from ethylene glycol, such as the following:

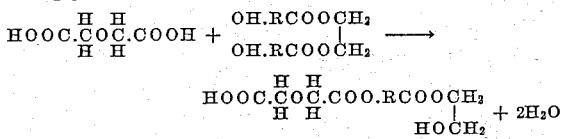

Naturally, if ethylene glycol is replaced by diethylene glycol, water solubility is enhanced. This is also true if triethylene glycol, tetraethylene glycol, or some higher homolog in the series is employed. Similarly, some other polyhydric alcohol, such as, for example, glycerol, diglycol, sorbitol, sorbitan, pentaerythritol, or the like can be treated with an alkylene oxide, such as ethylene oxide, propylene oxide, butylene oxide, or the like, to produce ether alcohols, or more specifically, etherified diols or etherified triols, in which the ether linkage occurs one time, or perhaps, several times at each original hydroxyl position. Thus, following such procedure, one may obtain compounds which are actually water-soluble. In a broader sense then, the compounds herein contemplated may be oil-soluble, or oil-insoluble; they may be water-soluble, or water-insoluble, and may, in fact, show little or no solubility in either oil or water. This latter statement is something of a paradox, but it is to be emphasized that these esters are frequently effective at enormous dilutions, when used as demulsifiers for water-in-oil emulsions. For instance, we have repeatedly conducted experimental tests in which the ratios employed vary from 1 part of demulsifier to 10,000, and at times, up to 50,000 parts of emulsion. For practical purposes, when a compound is soluble in less than 1 part to 10,000, it is commonly referred to as "insoluble," but in such extremely dilute range the word "insoluble" is purely relative, and perhaps meaningless.

As an example of enhanced water solubility, one need only replace ethyleneglycol with nonaethyleneglycol, or some higher homologue, such as examples where $n$ in the following formula represents values from 7 to 15. Compare this formula with an analogue involving ricinoleic acid ester of ethyleneglycol:

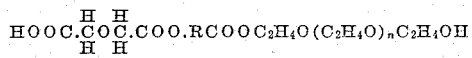

Nonaethyleneglycol hexaricinoleate, a product which is commercially available, is of distinct utility when converted into acidic glycollic acid esters. Such esters can be esterified further with polyhydric alcohols of the kind herein defined.

In the preparation of esterification products, the esterification reaction may be caused to take place readily upon the application of heat, the reaction being more rapid the higher the temperature that is employed, but care should be taken not to employ excessively high temperatures which would cause decomposition. The reaction, may, if desired, be in the presence of an inert solvent, such xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas such as nitrogen or $CO_2$. If desired, a small amount of catalyst, for instance, one-half to one and one-half percent of toluene sulfonic acid, may be added. Generally speaking, however, the reactions take place rapidly, quickly and completely, by simply heating substances to enter into the reaction in desired stoichiometric proportions at a temperature above the boiling point of water, usually between about 110° and 160° C., provided there is no decomposition. The most desirable products are obtained by combinations, in which the ratio of moles of diglycollic acid to moles of particular material reacting therewith are within the ratios of 1 to 3 and 3 to 1.

Esterification reactions of the kind contemplated are used for the production of a wide variety of esters, resinous materials, sub-resinous materials, and include plasticizers. Attention is directed to the following patents, which are a cross-section of conventional esterification procedure which can be applied in any instance to the production of the herein contemplated esters.

British Patent No. 422,845, Jan. 14, 1935
British patent to Eckey No. 500,765, Feb. 15, 1939
U. S. patent to—
  Malm, No. 2,170,030, Aug. 22, 1939
  Bradley, No. 2,166,542, July 18, 1939
  Barrett, No. 2,142,989, Jan. 10, 1939
  Frazier, No. 2,075,107, Mar. 30, 1937
  Sly, No. 2,073,031, Mar. 9, 1937
  Bradley, No. 1,951,593, Mar. 20, 1934
  Lawson, No. 1,909,196, May 16, 1933
  Kessler, No. 1,714,173, May 21, 1929
  Van Schaack No. 1,706,639, Mar. 26, 1929
  Jones, No. 2,264,759, Dec. 2, 1941
  Wietzel, No. 1,732,392, Oct. 22, 1929
  Groves et al., No. 1,993,738, Mar. 12, 1935

Attention is directed to a comprehensive article entitled "Polyhydric alcohol esters of fatty acids, their preparation, properties and uses" by H. A. Goldsmith, in Chemical Reviews, volume 33, December 1943, Number 3.

The following are specific examples of the preparation of preferred products for use for the particular purpose herein indicated.

EXAMPLE 1

92 pounds of glycerol are added to 932 pounds of castor oil and the mixture stirred and heated to 250° C. for approximately 15 minutes. The mixture is allowed to cool to 200° C. and 500 pounds of diglycollic acid added and stirred in. Temperature is kept at 200° C. for from 1 to 6 hours, after which it is permitted to cool and is diluted with from 10 to 50% of a suitable solvent. The progress of the reaction can be determined by the usual analytical procedure involving the acid number. As the diglycollic acid combines, the acid number decreases. When the acid number, due to the diglycollic acid, is one-half its original value, showing that one carboxyl of the diglycollic acid is combined, reaction should be stopped. The reaction may be hastened by passing through dry carbon dioxide, or adding a quarter of a percent of one of the conventional catalysts, such as toluene sulfonic acid.

EXAMPLE 2

One pound mole of diethylene glycol (mono)-ricinoleate being an amber oil having a specific gravity approximating that of water and a saponification number of 150 to 160, is esterified in the conventional manner ordinarily used in the production of phthalated derivatives with one pound mole of diglycollic acid. In brief, the procedure employs rapid agitation so as to keep the two reactants thoroughly mixed at approximately 250° C. or slightly less. The reaction is stopped just as soon as one carboxyl radical has combined. Such point is indicated by the acid number. Generally speaking, such reaction is complete in two to 8 hours. It can be hastened by passing through dry carbon dioxide or adding a quarter of a percent of one of the conventional catalysts, such as toluene sulfonic acid.

EXAMPLE 3

One pound mole of diethylene glycol glyceryl (mono) ricinoleate being a dark red oil, specific gravity about 0.95 and having a saponification value of 180 to 210, is substituted for the ricinoleate in Example 2, preceding.

EXAMPLE 4

Diethylene glycol glyceryl (mono) ricinoleate being a dark orange oil having a specific gravity of 0.99 and a saponification value of 133 to 140, is substituted for the ricinoleate in Example 2, preceding.

EXAMPLE 5

The same procedure is followed as in Example 4, immediately preceding, except that the molal quantity of diglycollic acid employed is doubled.

EXAMPLE 6

Glyceryl (mono) ricinoleate, an orange oil having a specific gravity of 1.02 and a saponification number of 120 to 130, is substituted for the fractional ester in preceding experiments 4 and 5.

EXAMPLE 7

Mannitol (tri) ricinoleate, a dark amber viscous liquid having a specific gravity of 0.97 and a saponification number of 172 to 179, is substituted for the fractional ester in Examples 4 and 5, preceding.

EXAMPLE 8

The same procedure is followed as in Example 7, immediately preceding, except that 3 moles of diglycollic acid are employed instead of 1 and 2 moles for each mole of the ricinoleate.

EXAMPLE 9

Mannitol glyceryl (mono) stearate, a tan waxy product, having a specific gravity of 1.01 and a saponification number of 109 to 119, is used instead of ricinoleate in Examples 7 and 8, immediately preceding.

EXAMPLE 10

Sorbitol (tri) ricinoleate, a brown viscous liquid having a specific gravity of 0.96 and a saponification number of 172 to 179, is substituted for the fractional ester, in Examples 7 and 8, immediately preceding.

Specific examples of compounds which can be readily prepared from commercial products, include monoricinolein monodiglycollate, monoricinolein di(glycollate), diricinolein mono(diglycollate), diricinolein di(diglycollate) and similar diglycollates, in which the percentage of diglycollic acid has been increased, that is, a mixture of the diglycollates and triglycollates.

In the preparation of esters, particularly partial esters, from detergent-forming monocarboxy acids, and particularly higher fatty acids, one may employ other procedures. See Oil and Soap, volume 21, No. 5, page 145; volume 22, No. 3, page 57. For instance, pentaerythritol triricinoleate can be prepared by treating pentaerythritol with ketene so as to prepare the triacetate, and likewise, treating triricinolein with methyl or ethyl alcohol to form methyl or ethyl ricinoleate, and reacting such low molal triacetate under conditions described in the aforementioned articles, so as to yield methyl or ethyl acetate and the triricinoleate.

We wish to emphasize the fact that the most outstanding compounds herein contemplated for breaking petroleum emulsion, particularly from a viewpoint of effectiveness as demulsifiers, as well as ease and economy of manufacture, are those obtained by reaction between one pound mole of triricinolein and at least one pound mole of a polyhydric alcohol having at least 2 and not more than 4 hydroxyl radicals, such as ethylene glycol, glycerol, diglycerol, etc., followed by reaction with a plurality of pound moles of diglycollic acid without any subsequent change in respect to the uncombined carboxylic hydrogen atoms. Note particularly, preceding Example 1 illustrates this type of material. Such compounds are so outstanding that they represent, in effect, an invention within an invention. Such compounds of outstanding effectiveness for breaking petroleum emulsions, are limited to those which are substantially insoluble in both crude oil and in water.

What has just been said, applies with particular force to those examples which are obtained from selected reactants in such a manner that there is present not only free carboxyl radicals, but also uncombined hydroxyl radicals.

Some of the ester products above described are somewhat soluble in oil, while others are substantially insoluble in oil. If the ester product is such that only 1 part or less is soluble (as determined by usual visual methods) in 1,000 parts of ordinary straight-run kerosene from Pennsylvania crude, the product is to be regarded as substantially insoluble in oil. Most of the ester products hereinabove described are subresinous in character and of a tarry or balsamlike consistency. In the case of some of the interacting materials, especially the polyhydroxylated fatty bodies, it is possible, by prolonged heating, at relatively high temperatures, to obtain a product that is of a hard horny character and lacks appreciable solubility in oil or in lower aliphatic alcohols. Care should be taken not to produce such hard and totally oil-insoluble bodies.

Conventional demulsifying agents employed in the treatment of oil field emulsions are used as such, or after dilution with any suitable solvent, such was water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials herein described, when employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our herein described process is based upon its ability to treat certain emulsions more advantageously and at a somewhat lower cost than is possible with other available demulsifiers or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

One preferred and more narrow aspect of our invention, insofar as it is concerned with demulsification of petroleum emulsions of the water-in-oil type, is concerned with the admixture of the ester, as described, with a viscosity-reducing solvent, such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier and 15% to 60% solvent, largely, if not entirely, non-aqueous and so selected to give a solution or mixture particularly adaptable for proportional pumps or other measuring devices.

The following examples will illustrate the aspect of our invention:

DEMULSIFIER

*Example 1*

| | Per cent |
|---|---|
| Partial ester, as exemplified by previous Example 3 | 60 |
| Xylene | 20 |
| Isopropyl alcohol | 20 |

DEMULSIFIER

Example 2

| | Per cent |
|---|---|
| Fractional partial ester, as per previous Example 4 derived from reactants in molal ratio of 2½ to 1 | 80 |
| Cresylic acid | 20 |

DEMULSIFIER

Example 3

| | Per cent |
|---|---|
| Partial ester, as per previous Example 6 | 45 |
| Aromatic petroleum solvent | 20 |
| Isobutyl alcohol | 20 |
| Acetone | 15 |

(The above proportions represent percentage by weight.)

The results obtained with the herein contemplated compounds give results which are absolutely unexpected and unlooked-for, in light of the demulsifying action of other compounds of apparently analogous structure. For instance, it is conventional practice to use fractional esters derived from triricinolein or other esters, as herein described, as reactants, in combination with other dicarboxy acids, such as phthalic acid, maleic acid, malic acid, citraconic acid, azelaic acid, adipic acid, etc. On numerous emulsions, the diglycollic acid derivatives have given results which are simply outstanding, in comparison with such other analogous partial esters. In other words, it appears that for some unexpected reason, the ether grouping of diglycollic acid, in combination with the carboxylic radicals and the remainder of the molecule, give some exceedingly effective adsorption property or orientation property which gives results so extraordinarily unusual.

As typical of such results in actual practice, the following are noted:

FIELD TEST No. 1

On an oil-producing property located in the Duval County Field, at or near Freer, Texas, the emulsion produced contained approximately 30% of emulsion and water. The emulsion broke readily at 70° F., using a demulsifier corresponding substantially to Example 1, preceding. The residual oil contained a total of one-tenth percent emulsion or water. The total time involved, both in mixing and settling, was 30 minutes. The ratio of demulsifier used on the basis of barrels of recovered oil was 1 to 5,000. All told, such results represent an improvement of at least 40% over the next best available compound of the same structure, but obtained from some other dibasic acid, such as phthalic, maleic, adipic, etc. instead of diglycollic, notwithstanding the fact that this latter series of comparative tests were conducted at 20° F. higher in temperature.

FIELD TEST No. 2

On an oil-producing property located in the McFaddin Field, at or near McFaddin, Texas, the emulsion produced contained approximately 20% of emulsion and water. The emulsion broke readily at 70° F., using a demulsifier corresponding substantially to Example 1, preceding. The residual oil contained a total of one-tenth percent emulsion or water. The total time involved, both in mixing and settling, was 30 minutes. The ratio of demulsifier used on the basis of barrels of recovered oil, was 1 to 8,000. All told, such results represent an improvement of at least 60% over the next best available compound of the same structure, but obtained from some other dibasic acid, such as phthalic, maleic, adipic, etc., instead of diglycollic, notwithstanding the fact that this latter series of comparative tests were conducted at 40° F. higher in temperature.

FIELD TEST No. 3

On an oil-producing property located in the Dyersdale Field, at or near Dyersdale, Texas, the emulsion produced contained approximately 30% of emulsion and water. The emulsion broke readily at 70° F., using a demulsifier corresponding substantially to Example 1, preceding. The residual oil contained a total of one-tenth percent emulsion or water. The total time involved, both in mixing and settling, was 45 minutes. The ratio of demulsifier used on the basis of barrels of recovered oil, was 1 to 10,000. All told, such results represent an improvement of at least 50% over the next best available compound of the same structure, but obtained from some other dibasic acid, such as phthalic, maleic, adipic, etc., instead of diglycollic.

The polyhydric alcohol esters herein contemplated for reaction with diglycollic acid, may be considered as being in the class of an alcohol, i. e., a monohydric alcohol, or a polyhydric alcohol. For instance, diolein would exemplify a monohydric alcohol, whereas, mono-olein, mono-ricinolein, diricinolein, etc. would represent a polyhydric alcohol. If an alcohol is indicated by the formula:

$$X'(OH)_n$$

where $n$ indicates the number 1 or more, and if diglycollic acid be indicated for convenience by the formula:

$$X'(COOH)_2$$

then the reaction between an alcohol and a diglycollic acid will result in a compound which may be indicated by the following formula:

$$YX(COOH)_{n'}$$

where $n'$ indicates the number 1 or more, and which is, in reality, a contraction of a more elaborate structural formula, in which X' and Y' are joined by a carboxyl radical or residue. Assuming, however, as would be true in the majority of cases, that the alcohol actually would be a polyhydric alcohol, then examination reveals that the formula might result in a combination, in which there were neither residual carboxyl radicals, nor residual hydroxyl radicals, or might result in compounds in which there were residual hydroxyl radicals and no residual carboxyl radicals, or compounds where there might be residual carboxyl radicals and no residual hydroxyl radicals; or there might be both. This is indicated by the following:

$$(Y.X)_q(OH)_{n'}$$

$$(Y.X)_q(COOH)_{m'}$$

$$(OH)_{n''}(YX)_q(COOH)_{m''}$$

in which $q$ indicates a small whole number (one in the case of a monomer and probably not over 10, and usually less than 6), and $m'$ and $n'$ indicate the number one or more, and $m''$ and $n''$ indicate a small or moderately-sized whole number, such as 0, 1 or more, but in any event, probably a number not in excess of 10. Actually, the preferable type of reagent would be more apt to contain less than 8, and in fact, less than 6 free hydroxyl radicals. It is not necessary to remark that residual carboxyl radicals can be permitted to remain as such, or can be converted in any suitable manner, into an ester. Conversion into the ester would be by means of a monohydric alcohol such as methyl alcohol, ethyl alcohol, propyl alcohol, butyl alcohol, hexyl alcohol, etc.

For practical purposes, however, we have found that the most desirable products are obtained by combinations, in which the ratio of the alcoholic reactant to the acid is within the ratio of three to one and one to five, and in which the molecular weight of the resultant product does not exceed 5,000, and is usually less than 5,000, and preferably, less than 3,000. This is particularly true if the resultant product is soluble to a fairly definite extent, for instance, at least 5% in some solvent, such as water, alcohol, benzene, dichloroethyl ether, acetone, cresylic acid, or the like. This is simply another way of stating that it is preferable that the product be of the sub-resinous type, which is commonly referred to as an A resin, or a B resin, as distinguished from a C resin, which is a highly infusible, insoluble resin (see Ellis, Chemistry of Synthetic Resins (1935), pages 862, et seq.).

In recapitulating what has been said previously, the sub-resinous, semi-resinous, or resinous product herein contemplated may be indicated by the following formula:

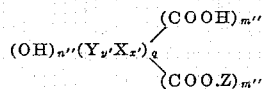

in which the characters have their previous significance, and $y'$ represents a small whole number not greater than 3, and $x'$ represents a small whole number not greater than 5; $q$ is a small whole number less than 10, and preferably 1 to 5. Z represents a hydrogen ion equivalent, such as a hydrogen atom, or an organic radical derived from a monohydric alcohol.

Sub-resinous materials having the repetitious unit appearing 3 to 10 times and having a plurality of free carboxyl radicals or free hydroxyl radicals, or both, are well known in a variety of forms and find practical application in demulsification of crude oil emulsions. Generally speaking, the molecular weight of such sub-resinous materials, regardless of class, is less than 10,000 and is more apt to be in a range of 3,000 to 5,000 as an upper limit. A more elaborate description of this type of material appears in numerous patents concerned with demulsification of crude oil emulsions, and reference is made to such patents for a more elaborate description.

Attention is directed to our co-pending applications Serial Nos. 604,993, 604,995, 604,996, 604,997, 604,998, 604,999, 605,000, 605,001, and 605,002, filed July 13, 1945, all of which are related to the present application, in that such co-pending applications are concerned, among other things, with the breaking of oil field emulsions by means of demulsifiers containing a diglycollic acid radical.

The new chemical products or compounds herein described form the subject-matter of our divisional application Serial No. 707,979, filed November 5, 1946.

Having thus described our invention, what we claim as new and desire to secure by Letters Patent is:

1. A process for breaking petroleum emulsions of the water-in-oil type, characterized by subjecting the emulsion to the action of an acidic partial ester containing: (a) a polyhydric alcohol radical; (b) a diglycollic acid radical; and (c) an acyloxy radical containing 8 to 32 carbon atoms derived from a detergent-forming monocarboxy acid having 8 to 32 carbon atoms, at least one polyhydric alcohol radical being ester-linked with a group containing said acyloxy radical and the number of said groups ester-linked with at least one polyhydric alcohol radical being less than the valency of said polyhydric alcohol radical.

2. The process of claim 1, wherein said ester contains not over one polyhydric alcohol radical for each acyloxy radical.

3. The process of claim 1, wherein the ester contains not over one polyhydric alcohol radical for each acyloxy radical, and each of said acyloxy radicals is an acyloxy radical derived from a fatty acid having 8 to 32 carbon atoms.

4. The process of claim 1, wherein the ester contains not over one polyhydric alcohol radical for each acyloxy radical, and each of said acyloxy radicals is an acyloxy radical derived from an hydroxylated fatty acid having 8 to 32 carbon atoms.

5. The process of claim 1, wherein the ester contains only one polyhydric alcohol radical, and all detergent-forming monocarboxy acyloxy radicals are ricinoleyl radicals.

6. A process for breaking petroleum emulsions of the water-in-oil type, characterized by subjecting the emulsion to the action of diricinolein monodiglycollate.

7. A process for breaking petroleum emulsions of the water-in-oil type, characterized by subjecting the emulsion to the action of diricinolein di-diglycollate.

8. A process for breaking petroleum emulsions of the water-in-oil type, characterized by subjecting the emulsion to the action of diricinolein tri-diglycollate.

MELVIN DE GROOTE.
ARTHUR F. WIRTEL.

REFERENCES CITED

The following references are of record in the file of this patent:

UNITED STATES PATENTS

| Number | Name | Date |
|---|---|---|
| 1,977,146 | Roberts | Oct. 16, 1934 |
| 2,023,976 | Roberts | Dec. 10, 1935 |
| 2,310,395 | Carruthers | Feb. 9, 1943 |
| 2,363,506 | De Groote et al. | Nov. 28, 1944 |
| 2,366,190 | Hurn | Jan. 2, 1945 |